(12) United States Patent
Nair et al.

(10) Patent No.: US 8,996,748 B1
(45) Date of Patent: Mar. 31, 2015

(54) PROVIDING MULTI-INITIATOR SERIAL ADVANCED TECHNOLOGY ATTACHMENT SUPPORT IN A MULTI-INITIATOR ENVIRONMENT

(71) Applicant: LSI Corporation, San Jose, CA (US)

(72) Inventors: Naman Nair, Fremont, CA (US); Brad D. Besmer, Colorado Springs, CO (US); Peter C. Rivera, Colorado Springs, CO (US); James Rizzo, Austin, TX (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/166,048

(22) Filed: Jan. 28, 2014

Related U.S. Application Data

(60) Provisional application No. 61/925,743, filed on Jan. 10, 2014.

(51) Int. Cl.
*G06F 3/00* (2006.01)
*G06F 9/44* (2006.01)

(52) U.S. Cl.
CPC .................................. *G06F 9/4411* (2013.01)
USPC ........................................................... 710/10

(58) Field of Classification Search
CPC ..................................................... G06F 9/4411
See application file for complete search history.

(56) References Cited

U.S. PATENT DOCUMENTS

2011/0320706 A1   12/2011  Nakajima
2013/0045010 A1   2/2013   Mukai

*Primary Examiner* — Idriss N Alrobaye
*Assistant Examiner* — Ronald Modo
(74) *Attorney, Agent, or Firm* — Suiter Swantz pc llo

(57) ABSTRACT

A storage system and method for preventing propagation of link reset among initiators in the storage system is disclosed. The method includes issuing a link reset command by the initiator, and entering the initiator into a back-off period immediately following the issuing of the link reset command. The initiator remains idle for the entire duration of the back-off period and resumes its operations at the end of the back-off period.

20 Claims, 2 Drawing Sheets

PROVIDING MULTI-INITIATOR SERIAL ADVANCED TECHNOLOGY ATTACHMENT SUPPORT IN A MULTI-INITIATOR ENVIRONMENT

CROSS-REFERENCE TO RELATED APPLICATIONS

The present application claims the benefit under 35 U.S.C. §119(e) of U.S. Provisional Application Ser. No. 61/925,743, filed Jan. 10, 2014. Said U.S. Provisional Application Ser. No. 61/925,743 is hereby incorporated by reference in its entirety.

TECHNICAL FIELD

The present invention relates to the field of data storage and particularly to a multi-initiator serial attached data storage environment.

BACKGROUND

Serial protocols such as Serial Advanced Technology Attachment (SATA) and Serial Attached Small Computer System Interface (Serial Attached SCSI, or SAS) are commonly used to provide serial communication interfaces to move data to and from computer storage devices such as hard disk drives and the like. For instance, SATA is a computer bus interface that connects host bus adapters to storage devices. SAS, on the other hand, utilizes a point-to-point serial protocol that moves data to and from computer storage devices.

SUMMARY

Accordingly, an embodiment of the present disclosure is directed to a method for preventing propagation of link reset among initiators in a multi-initiator topology. The method includes configuring each particular initiator of the plurality of initiators to enter a predetermined back-off period when that particular initiator issues a link reset command. Upon entering the predetermined back-off period, that particular initiator remains idle for an entire duration of the back-off period. The method also includes configuring each particular initiator of the plurality of initiators to resume operation at the end of the back-off period.

A further embodiment of the present disclosure is directed to a method for resetting links for an initiator in a multi-initiator topology. The method includes issuing a link reset command by the initiator, and entering the initiator into a back-off period immediately following the issuing of the link reset command. The initiator remains idle for the entire duration of the back-off period and resumes its operations at the end of the back-off period.

An additional embodiment of the present disclosure is directed to a storage system. The storage system includes at least one target device and at least one expander configured to communicatively couple a plurality of initiators to the at least one target device. Each particular initiator of the plurality of initiators is configured to enter a predetermined back-off period when that particular initiator issues a link reset command, and upon entering the predetermined back-off period, that particular initiator remains idle for the entire duration of the back-off period. Each particular initiator of the plurality of initiators is also configured to resume operation at the end of the back-off period.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Figure 1:
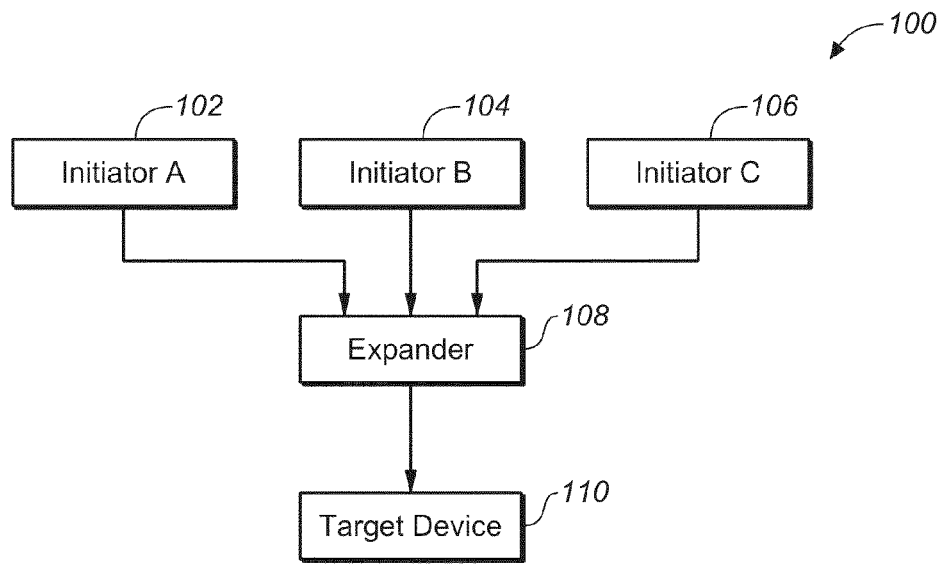
FIG. 1 is a block diagram depicting an exemplary multi-initiator system having three initiators sharing at least one target.

Reference will now be made in detail to the presently preferred embodiments of the invention, examples of which are illustrated in the accompanying drawings.

While SAS protocol provides for multiple initiators in a SAS domain, SATA is primarily designed for a single initiator environment. Extensions such as SATA affiliations allow for multi-initiators to communicate with a single SATA target, but protocol and error recoveries from events such as link disruptions or the like are still very difficult to handle.

Generally, most error recovery of transport, protocol or SATA target device requires issuing a link reset command (LINK RESET), which causes the device to abort all commands. Upon recognizing that a LINK RESET occurred, an initiator (unless it originated the LINK RESET) would then also issue a LINK RESET to ensure all its commands are aborted, before it can reissue its input/output (IOs) again. In a multi-initiator environment, suppose a first initiator issues a first LINK RESET and a second initiator, upon recognizing the first issued LINK RESET, issues a second LINK RESET at a later time, this second LINK RESET may abort the first initiator's newly reissued IOs and cause the first initiator to issue another (third) LINK RESET, when it detects the second LINK RESET. This process propagates a LINK RESET storm, disrupting the topology. The LINK RESET storm occurs because SATA protocol does not provide a way for an initiator to know which commands are active, thus it cannot infer, which commands were aborted, and therefore needs to issue a LINK RESET to abort all commands.

Embodiments of the present disclosure are directed to systems and methods to allow various initiators to co-operate gracefully to recover from errors. More specifically, a back-off period is established to conditionally force each initiator to hold its input/output (IO) commands. The systems and methods in accordance with embodiments of the present disclosure are particularly useful for implementing multi-initiator SATA support in a multi-initiator SAS environment, wherein at least one expander is utilized to provide a proxy to manage SATA affiliations, and multiple SATA initiators are allowed to simultaneously and actively access one or more shared SATA target. SAS initiators using SATA Tunneled Protocol (STP) can also access the shared SATA targets utilizing the systems and methods in accordance with embodiments of the present disclosure.

In one embodiment, all initiators in a multi-initiator system are configured to execute the same method to prevent LINK RESET propagation. That is, each initiator in the multi-initiator system is configured to utilize a predetermined back-off period to ensure that the link is stabilized before issuing any IOs. Utilizing such a back-off period reduces the chance of another initiator issuing a LINK RESET which would result in propagating a LINK RESET storm as described above. During the back-off period, which begins after each initiator issues its LINK RESET, that particular initiator does not issue any IOs, or LINK RESETs, in response to any detected phy change count updates and/or detected LINK RESETs issued by other initiators. Once the back-off period expires, that particular initiator can then safely reissue its IOs, after performing any required initialization functions.

Figure 2:
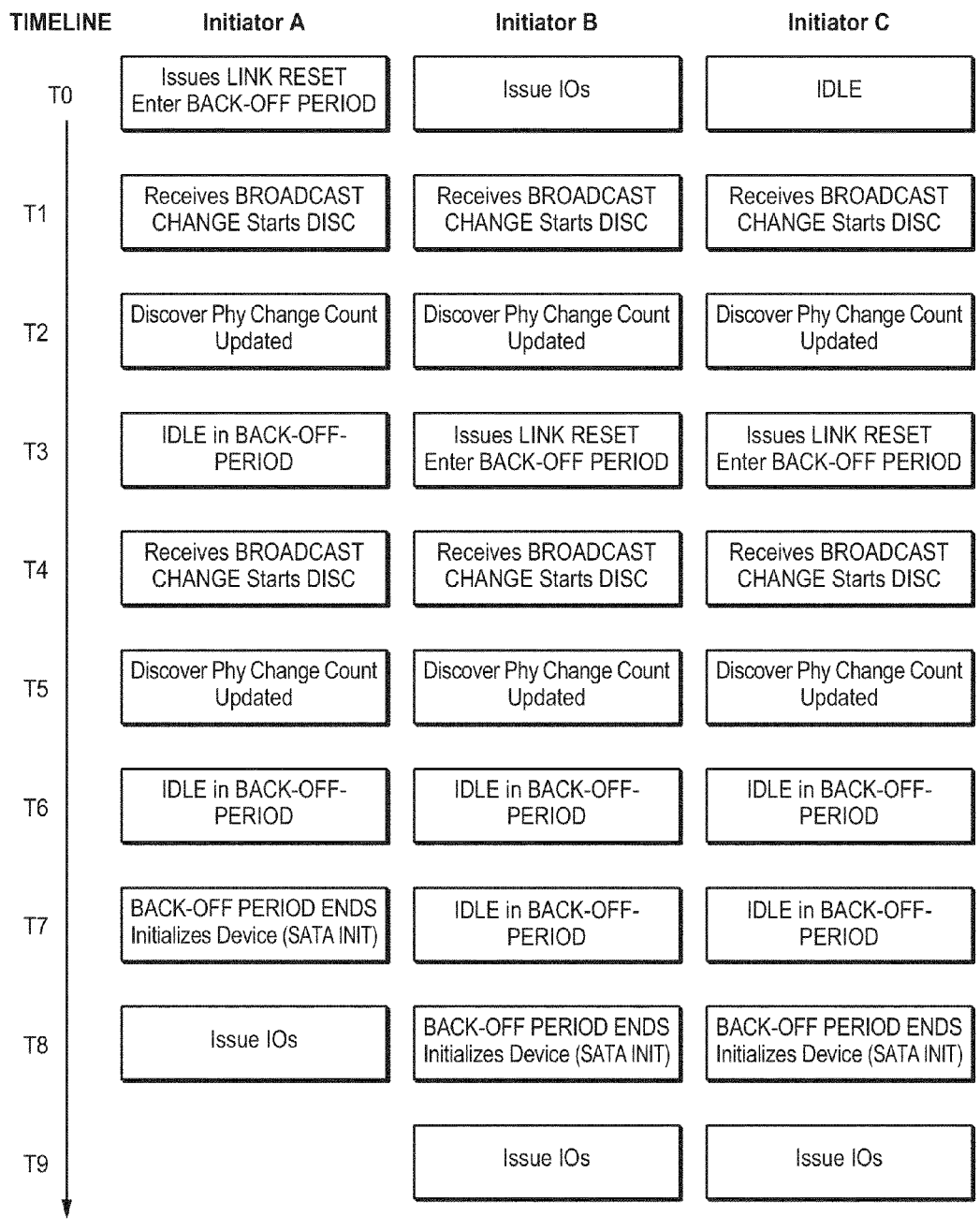
FIG. 2 is an illustration depicting each of the three initiators of FIG. 1 utilizing a back-off period to prevent propagation of link reset.

Referring to FIGS. 1 and 2. FIG. 1 shows a block diagram of an exemplary multi-initiator system 100 having three initiators (Initiator A 102, Initiator B 104, and Initiator C 106) sharing at least one target 110 via an expander 108, and FIG. 2 shows a time-based illustration depicting the back-off period utilized by these three initiators. Suppose Initiator A needs to reset its links and therefore issues a LINK RESET at time T0, Initiator A immediately enters the back-off period and is not allowed to issue any new IOs during this back-off period. It is contemplated that Initiator A may issue the LINK RESET for various reasons, such as to recover from an error, or upon detecting a phy change during discovery (denoted in the figure as DISC). For illustrative purposes, suppose that a phy change is detected, such a change is also broadcasted to all initiators in the multi-initiator environment, as indicated in FIG. 2.

This phy change will also prompt Initiator B and Initiator C to reset their links accordingly, and they will each issue their own LINK RESET and immediately enter their corresponding back-off period, during which they are not allowed to issue any new IOs either. As illustrated in FIG. 2, the back-off period observed by each initiator allows for the other initiators to issue their own LINK RESETs, and also ensures no initiator's IOs are aborted, because none has been issued. That is, once an initiator issues a LINK RESET, it enters its back-off period, and does not issue any IOs or LINK RESETs, in response to any new discovery events (which would prompt a LINK RESET in a conventional system). Utilizing the back-off period in this manner prevents the propagation of a LINK RESET storm, and allows the initiators to safely reissue the IOs once their own back-off periods expire.

It is contemplated that the duration of the back-off period can be a predetermined number of seconds or the like. It is understood that the specific duration of the back-off period may vary based on the specific multi-initiator topology. For instance, a longer duration may be necessary for a topology that includes more initiators compared to a topology with less number of initiators. Various other factors, such as processing speed and the like may also be taken into consideration when determining the duration of the back-off period. It is also contemplated that the duration of the back-off period may be universal for all initiators, or may be individually configurable for the initiators in the same multi-initiator topology without departing from the spirit and scope of the present disclosure, as long as the duration is greater than or equal to a predetermined minimum period.

Figure 3:
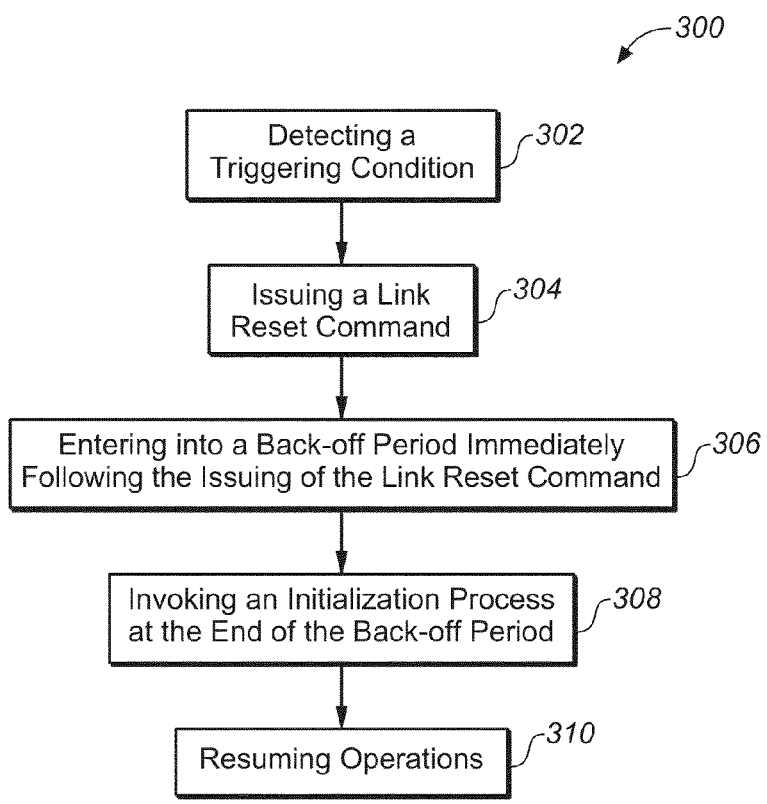
FIG. 3 is a flow diagram illustrating a method for preventing propagation of link reset among multiple initiators in a multi-initiator topology.

Referring now to FIG. 3, a flow diagram illustrating a method 300 for preventing propagation of link reset commands among multiple active/active SATA initiators in a multi-initiator topology is shown. In one embodiment, the method 300 is implemented on each and every initiator in the multi-initiator topology. That is, each initiator includes a processing module (e.g., a computer processor) configured for executing method 300 when that initiator issues a LINK RESET command.

More specifically, upon detecting a triggering condition in step 302 that requires the initiator to reset its links, a LINK RESET command is issued in step 304. As described above, the triggering condition includes phy change or error recovery of any transport, protocol or target devices. Immediately following the issuance of the LINK RESET, this initiator enters a back-off period for a predetermined duration in step 306. During this back-off period, the initiator does not issue any IOs, or LINK RESETs, in response to any triggering condition that may otherwise trigger another LINK RESET command from this initiator. That is, the initiator remains idle for the duration of the back-off period to prevent LINK RESET propagation from occurring. Once the back-off period expires, the initiator initializes the communication interface (e.g., invoking SATA initialization, or SATA INIT) in step 308 and operations resume in step 310. SATA initialization can include a series of commands to enumerate the device type/configuration as well as perform basic configuration for operations.

It is to be understood that the present disclosure may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for preventing propagation of link reset among a plurality of initiators in a multi-initiator topology, the method comprising:

configuring each particular initiator of the plurality of initiators to enter a predetermined back-off period when that particular initiator issues a link reset command, wherein upon entering the predetermined back-off period, that particular initiator remains idle for an entire duration of the back-off period; and configuring each particular initiator of the plurality of initiators to resume operation at an end of the back-off period.

2. The method of claim 1, wherein the multi-initiator topology is a Serial Attached Small Computer System Interface (SAS) topology.

3. The method of claim 2, wherein each particular initiator of the plurality of initiators is at least one of:
- a Serial Advanced Technology Attachment (SATA) initiator; and
- a Serial Attached Small Computer System Interface (SAS) initiator utilizing a Serial Advanced Technology Attachment Tunneled Protocol.

4. The method of claim 3, wherein each particular initiator of the plurality of initiators is communicatively coupled to at least one SATA target via at least one expander, wherein the at least one expander is utilized to provide a proxy to manage SATA affiliations for said particular initiator.

5. The method of claim 4, wherein each particular initiator of the plurality of initiators invokes a SATA initialization process prior to resume operation at the end of the back-off period.

6. The method of claim 1, wherein the predetermined back-off period is universal for the plurality of initiators.

7. The method of claim 1, wherein the predetermined back-off period is individually configurable for each particular initiator of the plurality of initiators.

8. A method for resetting links for an initiator in a multi-initiator topology, the method comprising:
- issuing a link reset command by the initiator;
- entering the initiator into a back-off period immediately following said issuing of the link reset command, wherein the initiator remains idle for an entire duration of the back-off period; and
- resuming operations of the initiator at an end of the back-off period.

9. The method of claim 8, wherein the multi-initiator topology is a Serial Attached Small Computer System Interface (SAS) topology.

10. The method of claim 9, wherein the initiator is at least one of:
- a Serial Advanced Technology Attachment (SATA) initiator; and
- a Serial Attached Small Computer System Interface (SAS) initiator utilizing a Serial Advanced Technology Attachment Tunneled Protocol.

11. The method of claim 10, wherein the initiator is communicatively coupled to at least one SATA target via at least one expander, wherein the at least one expander is utilized to provide a proxy to manage SATA affiliations for the initiator.

12. The method of claim 11, further comprising:
- invoking a SATA initialization process prior to resuming operations of the initiator at the end of the back-off period.

13. The method of claim 8, wherein the initiator is prevented from issuing any input/output requests or link reset commands during for the entire duration of the back-off period.

14. A storage system, comprising:
- at least one target device; and
- at least one expander configured to communicatively couple a plurality of initiators to the at least one target device,
- wherein each particular initiator of the plurality of initiators is configured to enter a predetermined back-off period when that particular initiator issues a link reset command,
- wherein upon entering the predetermined back-off period, that particular initiator remains idle for an entire duration of the back-off period, and
- wherein each particular initiator of the plurality of initiators is configured to resume operation at an end of the back-off period.

15. The storage system of claim 14, wherein the storage system implements a multi-initiator Serial Attached Small Computer System Interface (SAS) topology.

16. The storage system of claim 15, wherein each particular initiator of the plurality of initiators is at least one of:
- a Serial Advanced Technology Attachment (SATA) initiator; and
- a Serial Attached Small Computer System Interface (SAS) initiator utilizing a Serial Advanced Technology Attachment Tunneled Protocol.

17. The storage system of claim 16, wherein the at least one expander is utilized to provide a proxy to manage SATA affiliations for the plurality of initiators.

18. The storage system of claim 17, wherein each particular initiator of the plurality of initiators invokes a SATA initialization process prior to resume operation at the end of the back-off period.

19. The storage system of claim 14, wherein the predetermined back-off period is universal for the plurality of initiators.

20. The storage system of claim 14, wherein the predetermined back-off period is individually configurable for each particular initiator of the plurality of initiators.

* * * * *